Aug. 8, 1961   M. H. EASY   2,995,745
RADAR DISPLAY APPARATUS
Filed March 14, 1958   2 Sheets-Sheet 2
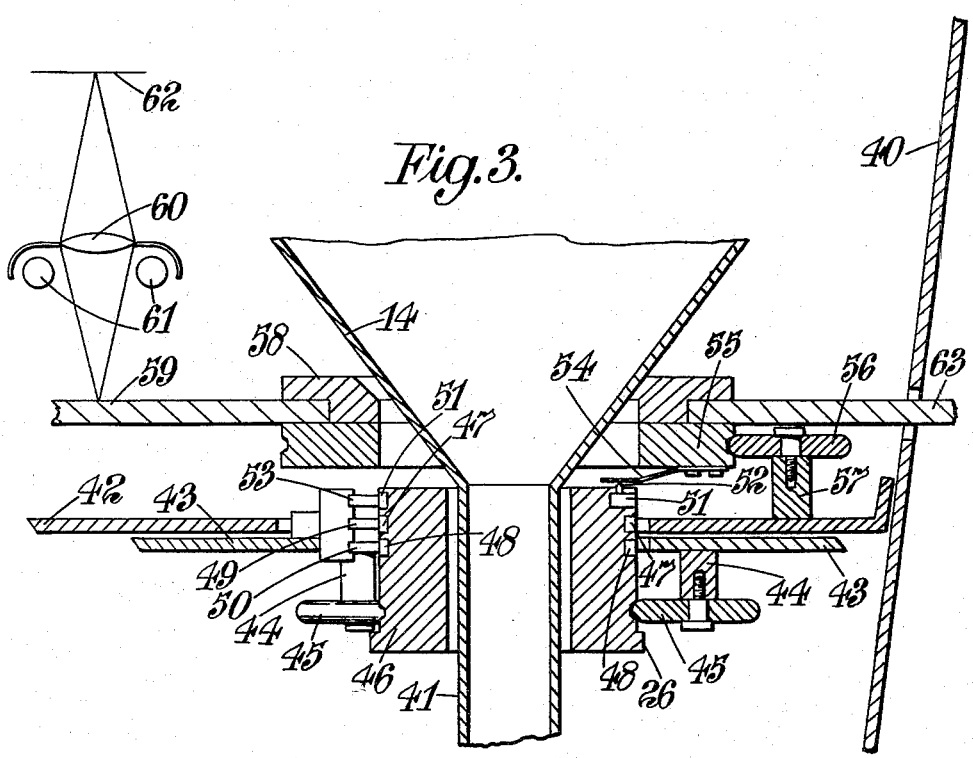

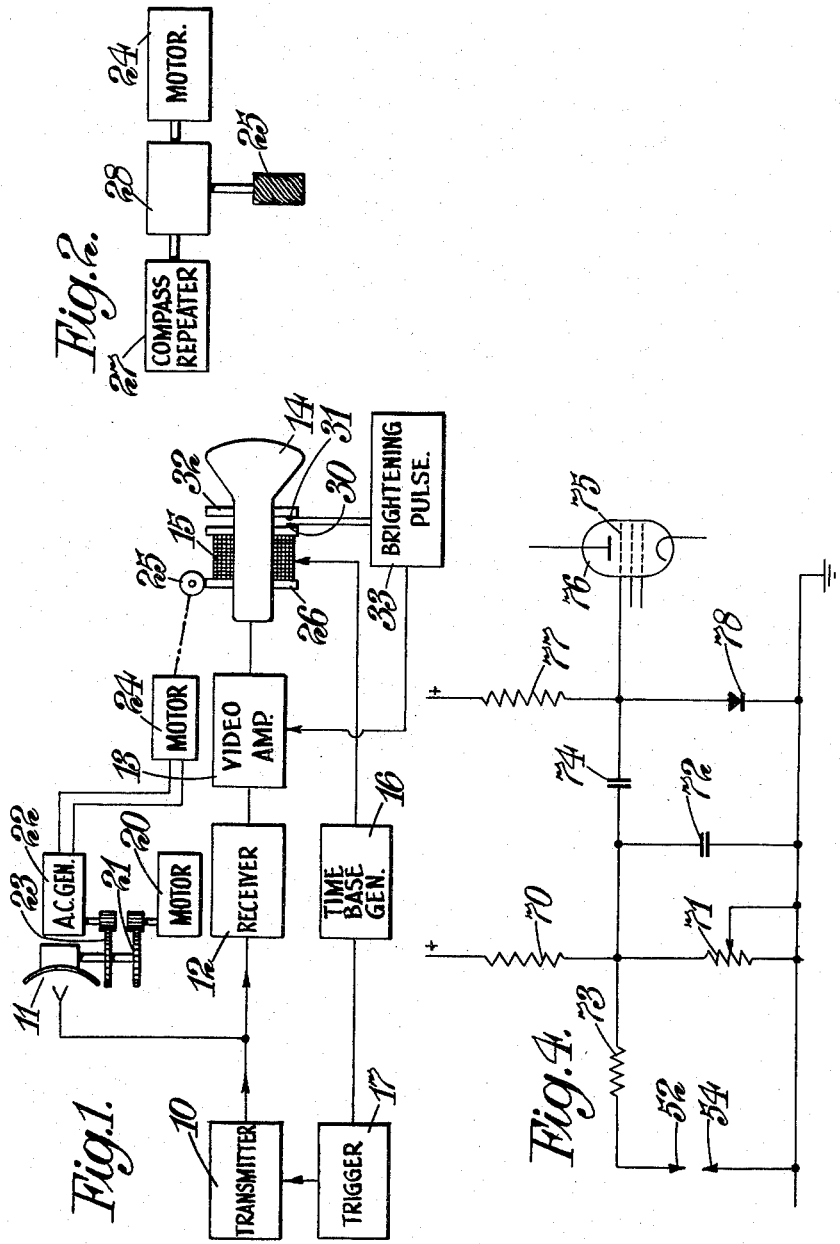

United States Patent Office 2,995,745
Patented Aug. 8, 1961

2,995,745
RADAR DISPLAY APPARATUS
Maurice Henry Easy, London, England, assignor to The Decca Record Company Limited, London, England, a British company
Filed Mar. 14, 1958, Ser. No. 721,438
10 Claims. (Cl. 343—11)

This invention relates to plan position radar display apparatus of the kind (hereinafter described as "the kind described") having a cathode ray tube with a deflection coil system which is rotated around the neck of the tube in synchronism with the rotation of the radar aerial to effect rotation of a trace on the screen of the tube.

According to this invention, in apparatus of the kind described there are provided co-operating contacts operated by driving means rotating in synchronism with the rotation of the radar aerial so as to close for a short period once in each revolution of the aerial, circuit means controlled by said contacts for brightening the trace on the cathode ray tube so as to provide a bearing marker on the screen of the tube, and adjusting means for altering the timing of the closing of the contacts within the cycle of aerial rotation so that the position of the bearing marker may be adjusted. Such an arrangement provides a bearing marker on the screen of the tube, the position of which may be adjusted so that it lies in a direction on the screen corresponding to any required compass direction and which, unlike mechanically rotatable bearing markers, is not effected by any off-centering of the display since the bearing marker will be off-centered in exactly the same way as the display.

The aforementioned adjusting means may be provided with a calibrated scale to facilitate setting of the bearing marker to a required direction.

If the radar apparatus is used on a vehicle, such as a ship, the co-operating contacts would be driven in accordance with both the rotation of the radar aerial and the changes of the compass heading of the vehicle so that the bearing marker trace will appear in a fixed compass direction on the screen of the tube. Such an arrangement may be used both with a stabilised display, that is to say a display in which compass directions remain fixed on the screen, or a relative display, that is to say a display in which the direction of the heading of the vehicle remains fixed on the screen.

The co-operating contacts may be contacts of a switch operated by a cam driven by an electric motor which may conveniently be the drive motor for the deflection coil system. Preferably, however, the contacts comprise a first contact on a rotatable member driven about an axis in synchronism with the rotation of the radar aerial and a co-operating second contact on a second member rotatable about the same axis, whereby said second member forms said adjusting means. With this arrangement the second member may be rotated to effect adjustment of the position of the bearing marker and may be provided with a calibrated scale co-operating with a fixed index mark or alternatively may be provided with an index mark for co-operating with a fixed scale.

Most conveniently said first contact is on the deflection coil or on the holder therefor, and the second contact is on a member adjacent the coil and rotatable around the neck of the tube. In such an arrangement conveniently the second member may carry a calibrated scale having markings which are visible through a window in a cover plate adjacent the screen of the tube.

The following is a description of one embodiment of the invention, reference being made to the accompanying drawings in which:

FIGURE 1 is a diagrammatic representation of a radar apparatus;
FIGURE 2 is a diagram illustrating a modification of part of the apparatus of FIGURE 1;
FIGURE 3 is a diagrammatic sectional view of part of the apparatus of FIGURE 1; and
FIGURE 4 is a circuit diagram illustrating part of the apparatus of FIGURE 1.

Referring to FIGURE 1 there is illustrated diagrammatically radar apparatus comprising a transmitter 10 arranged to produce short duration pulses of radio frequency energy which are radiated from a directional scanning aerial 11. Echoes of these pulses from distant targets are received by a receiver 12 and, after detection, are amplified by a video amplifier 13 and fed to a cathode ray tube 14 to modulate the brightness of a radial line trace on the screen of the tube. This radial line trace is produced by a deflection coil system 15 which is rotated about the neck of the tube in synchronism with the rotation of the aerial 11 as will be more fully described later. To produce this radial line trace, there is fed to the deflection coil system a repetitive sawtooth current waveform from a time base generator 16. The time base generator is controlled in synchronism with the transmitted pulses by means of a trigger pulse generator 17 which initiates both the transmitted pulses and the time base sawtooth waveform. The directional aerial 11 is continuously rotated by means of a motor 20 which drives the aerial through reduction gearing illustrated diagrammatically at 21. An alternating current generator 22 is driven from the aerial 11 by means of gearing 23 so that the frequency of the alternating current is dependent upon the aerial rotation speed. This alternating current generator 22 provides current for a synchronous electric motor 24 which drives a worm 25 engaging a gear wheel 26 secured to the rotatable deflection coil system 15. The gear ratios are chosen so that the deflection coil system rotates at the same speed as the aerial. One such arrangement for rotating a deflection coil assembly in synchronism with the rotation of antenna is described in British Patent No. 664,858 to which reference may be had for a further description of such a system.

The apparatus thus far described gives, in the known manner, a radar plan position display. If the radar apparatus is used on a mobile craft, such as for example a ship, with the arrangement shown in FIGURE 1, the direction of the trace on the screen of the tube 14 will correspond to the bearing of the aerial relative to the craft and hence will produce what is known as a relative plan position radar display. If it is required that the plan position display should be stabilised in azimuth so that any given direction on screen of the tube corresponds to a constant compass direction, then the deflection coil system 15 may be rotated under the joint control of the motor 24 and of a compass repeater. Such an arrangement is illustrated diagrammatically in FIGURE 2 in which the motor 24 and a compass repeater 27 drives the two inputs of a differential gear 28, the output of which drives the aforementioned worm 25.

The present invention is concerned more particularly with the provision of a bearing marker in the form of a bright trace on the screen of the tube which can be set to correspond to any desired direction. For this purpose there are provided a pair of contacts illustrated diagrammatically in FIGURE 1 at 30, 31 of which contact 30 is mounted on the rotatable deflection coil system 15 and contact 31 is mounted on a member 32 rotatable about the neck of the cathode ray tube. As the deflection coil system is rotated, the contacts 30, 31 will periodically close and open, the angular position at which such closing and opening takes place being dependent on the angular position of the member 32. By means of a brightening pulse control circuit 33 to be more fully described later, the trace is brightened when the contacts are closed.

The means for producing this bearing marker trace are more fully illustrated in FIGURES 3 and 4. Referring to FIGURE 3 there is shown diagrammatically in section the cathode ray tube 14 which is supported by means not shown, in a casing 40. The neck 41 of the tube passes through an aperture in a fixed member 42 forming a part of the casing and also through an aperture in a member 43. This latter member 43 is supported, by means not shown, from the fixed member 42 in a manner allowing a small movement in rotation about the axis of the cathode ray tube for the purpose of allowing a fine adjustment of alignment between the trace on the screen of the tube and the scanning aerial 11. Supported on the member 43 are three pillars 44 which are equi-spaced around the axis of the tube 14. These pillars carry rollers 45 which run in grooves in a housing 46 for the deflection coil assembly, the rollers thus forming supporting means permitting rotation of the deflection coil assembly about the neck of the tube. The aforementioned worm 25 (FIGURES 1 and 2) drives a pinion wheel 26 which, as shown in FIGURE 3, is formed integrally with the deflection coil housing 46. Electrical connections to the deflection coil are effected through two slip rings 47, 48 which co-operate respectively with two slip ring contact fingers 49, 50 connected to the aforementioned time base generator 16 (FIGURE 1). A third slip ring 51 on the deflection coil housing 46 is connected to a contact stud 52 which protrudes slightly from the front end of the deflection coil housing 46. A slip ring contact finger 53 co-operating with the slip ring 51 is connected to the aforementioned brightening pulse circuit 33. A spring contact arm 54 mounted on a member 55 bears on the front end face of the deflection coil housing 46 and makes contact with the contact stud 52 periodically as the deflection coil housing 46 is rotated. The member 55 is rotatably mounted in the casing 40, being carried by rollers 56 on three pillars 57 which pillars are secured to the aforementioned fixed member 42 and are evenly spaced around the axis of the tube. For simplicity in the drawing only one of the rollers 56 and pillars 57 is shown. A clamping ring 58 clamps a plate 59 to the member 55. This plate 59 carries a bearing scale and the clamping ring 58 permits of the bearing scale being clamped in suitable angular alignment with the contact arm 54 when the apparatus is initially set up. The bearing scale might be arranged on a part of the plate 59 protruding outside the casing 40 and a co-operating pointer or index marker may be mounted on the outside of the casing 40 for reading the bearing scale. In the particular arrangement illustrated in FIGURE 3, however, the bearing scale is projected optically by means of a lens 60 and lamps 61 onto a translucent screen 62 which is conveniently formed on the front panel of the display apparatus adjacent the cathode ray tube screen. It will be readily apparent, however, that other optical means might be provided for viewing such a scale on the plate 59. The plate 59 in the embodiment illustrated of FIGURE 3 has a knurled edge 63 protruding through the outer wall of the casing 44 to enable the plate, and hence the member 55 and the contact arm 54, to be manually rotated about the axis of the cathode ray tube.

The circuit means for causing the closing of the contacts between the contact arm 54 and the stud 52 to produce a brightening pulse on the screen of the cathode ray tube are illustrated in further detail in FIGURE 4. Referring to that figure there are shown two resistors 70, 71 forming a potential divider across a source of positive voltage with respect to earth. The resistor 72 is adjustable enabling the voltage at the junction of the two resistors to be adjusted. Connected in shunt across the resistor 71 is a capacitor 72 which thus acquires a charge equivalent to the voltage across the resistor 71. Also connected in shunt across this resistor 71 are the two contacts 52, 54 in series with a resistor 73. The junction point of the resistors 70, 71 is connected through a capacitor 74 to the suppressor grid 75 of a pentode valve 76 forming an amplifier valve in the aforementioned video amplifier 13 (FIGURE 1). This suppressor grid is connected to a source of positive voltage through a resistor 77 of high magnitude but is restrained from going positive with respect to earth by a diode rectifier 78. The video signals to be displayed on the tube are fed as negative-going signals to the control grid of the valve.

When the contacts 52, 54 close, the capacitor 72 discharges to earth. The resistor 73 merely restricts the peak current flowing in the contacts to prevent excessive burning and wear. The sudden fall of voltage on the capacitor 72 is transmitted through the capacitor 74 to the suppressor grid of the valve 76 sending this suppressor grid negative and so cutting off the flow of anode current in the valve. When the contacts 52, 54 re-open after closure, the capacitor 72 re-charges and the suppressor grid returns to earth potential, so completing the cycle. The cutting off of the valve 76 produces a pulse in the video output circuit which brightens the trace of the cathode ray tube. The diode rectifier 78 prevents any positive overswing which would produce a black sector on the screen of the cathode ray tube. The adjustable resistor 71 permits adjustment of the brilliance of the bearing cursor line on the screen of the tube.

It will be seen that the arrangement described produces a bright trace on the screen of the tube the angular position of which may be adjusted by rotating the plate 59. This trace may thus be set to any required angle of position by rotating the plate 59 to the appropriate position indicated by the scale on the plate 59.

The whole plan position display may be off-centered in the known manner without affecting the control of the bearing marker trace.

I claim:

1. In plan position radar display apparatus of the kind having a cathode ray display tube with a deflection coil system arranged to be rotated around the neck of the tube about the axis thereof in synchronism with the rotation of an antenna to produce a rotating radial trace on the screen of the tube; the combination of a marker control member rotatable about the axis of the tube, switch means including a first element on said deflection coil system and a co-operating element on said marker control member arranged to be operated for a short period once in each revolution of the deflection coil system at an angular position dependent on the angular position of said marker control member about the axis of the tube, and circuit means controlled by said switch means to apply a trace brightness modulating signal to the cathode ray tube when said switch means are operated.

2. The combination as claimed in claim 1 wherein said switch means comprise a pair of co-operating switch contact elements, one mounted on said deflection coil system and the other on said marker control member.

3. The combination as claimed in claim 1 wherein said switch means comprise a pair of contacts on said marker control member and a cam arranged to operate said contacts on said deflection coil system.

4. In radar apparatus having a continuously rotatable directional antenna for transmitting radar pulses, plan position display apparatus comprising a cathode ray tube, a radial deflection coil system arranged in relation to the cathode ray tube so as to produce a radial trace on the screen of the tube and mounted for rotation about the neck of the tube, synchronized motor means for rotating the radial deflection coil system about the neck of the cathode ray tube in synchronism with the rotation of the antenna, a time base generator controlled in synchronism with the transmitted pulses and connected to supply a repetitive sawtooth current wave form to the radial deflection coil system, a video amplifier connected to the cathode ray tube for supplying a trace brightness modulating signal thereto in response to a received radar pulse or a brightening pulse input thereto, a brightening pulse control circuit connected to supply a brightening pulse to the video amplifier, switch means for operating the brightening pulse control circuit, said switch means comprising a continuously rotatable member mounted for rotation together with the radial deflection coil system and a co-operating member mounted for adjustable angular setting about the axis of the cathode ray tube and scale and index means for indicating the angular setting of the co-operating switch member.

5. Radar apparatus as claimed in claim 4, in which the switch means for operating the brightening pulse control circuit comprises a first switch contact mounted for rotation with the radial deflection coil system and a second switch contact mounted on a bearing marker control member for adjustable angular setting about the axis of the cathode ray tube.

6. Radar apparatus as claimed in claim 4, in which the switch means for operating the brightening pulse control circuit comprises a cam mounted for rotation with the radial deflection coil system and a cam-operated switch mounted on a bearing marker control member for adjustable angular setting about the axis of the cathode ray tube.

7. In radar apparatus having a continuously rotatable directional antenna for transmitting radar pulses, plan position display apparatus comprising a cathode ray tube, a radial deflection coil system arranged in relation to the cathode ray tube so as to produce a radial trace on the screen of the tube and mounted for rotation about the neck of the tube, synchronized motor means for rotating the radial deflection coil system about the neck of the cathode ray tube in synchronism with the rotation of the antenna, a time base generator controlled in synchronism with the transmitted pulses and connected to supply a repetitive sawtooth current waveform to the radial deflection coil system, a video amplifier connected to the cathode ray tube for supplying a trace brightness modulating signal thereto in response to a received radar pulse or a brightening pulse input thereto, a brightening pulse control circuit connected to supply a brightening pulse to the video amplifier, switch means for operating the brightening pulse control circuit, said switch means comprising a continuously rotatable member mounted for rotation together with the radial deflection coil system and a co-operating member mounted on a setting member for adjustable angular setting about the axis of the cathode ray tube, scale and index means moved relatively to each other by the setting member and optical projection means for indicating the angular setting of the co-operating switch member.

8. Radar apparatus for use on a dirigible craft having compass means responsive to craft heading, said radar apparatus having a continuously rotatable directional antenna for transmitting radar pulses, plan position display apparatus comprising a cathode ray tube, a radial deflection coil system arranged in relation to the cathode ray tube so as to produce a radial trace on the screen of the tube and mounted for rotation about the neck of the tube, synchronized motor means for rotating the radial deflection coil system about the neck of the cathode ray tube in synchronism with the rotation of the antenna, compass repeater means for rotating the radial deflection coil system about the neck of the cathode ray tube according to the compass setting, a time base generator controlled in synchronism with the transmitted pulses and connected to supply a repetitive sawtooth current waveform to the radial deflection coil system, a video amplifier connected to the cathode ray tube for supplying a trace brightness modulating signal thereto in response to a received radar pulse or a brightening pulse input thereto, a brightening pulse control circuit connected to supply a brightening pulse to the video amplifier, switch means for operating the brightening pulse control circuit, said switch means comprising a continuously rotatable member mounted for rotation together with the radial deflection coil system and a co-operating member mounted for adjustable angular setting about the axis of the cathode ray tube and scale and index means for indicating the angular setting of the co-operating switch member.

9. Radar apparatus for use on a dirigible craft having compass means responsive to craft heading, said radar apparatus having a continuously rotatable directional antenna for transmitting radar pulses, plan position display apparatus comprising a cathode ray tube, a radial deflection coil system arranged in relation to the cathode ray tube so as to produce a radial trace on the screen of the tube and mounted for rotation about the neck of the tube, motor means for rotating the radial deflection coil system about the neck of the cathode ray tube, a remote control system connected to control said motor means in synchronism with the rotation of the antenna, compass repeater means connected to control said motor means in accordance with craft heading, a time base generator controlled in synchronism with the transmitted pulses and connected to supply a repetitive sawtooth current waveform to the radial deflection coil system, a video amplifier connected to the cathode ray tube for supplying a trace brightness modulating signal thereto in response to a received radar pulse or a brightening pulse input thereto, a brightening pulse control circuit connected to supply a brightening pulse to the video amplifier, switch means for operating the brightening pulse control circuit, said switch means comprising a continuously rotatable member mounted for rotation together with the radial deflection coil system and a co-operating member mounted for adjustable angular setting about the axis of the cathode ray tube and scale and index means for indicating the angular setting of the co-operating switch member.

10. Radar apparatus for use on a dirigible craft having compass means responsive to craft heading, said radar apparatus having a continuously rotatable directional antenna for transmitting radar pulses, plan position display apparatus comprising a cathode ray tube, a radial deflection coil system arranged in relation to the cathode ray tube so as to produce a radial trace on the screen of the tube and mounted for rotation about the neck of the tube, a differential gearing having two input shafts and an output shaft with its output shaft connected for rotating the radial deflection coil system about the neck of the cathode ray tube, motor means driving one input shaft of the differential gearing correspondingly to the antenna rotation, a compass repeater driving the other input shaft of the differential gearing correspondingly to craft heading, a time base generator controlled in synchronism with the transmitted pulses and connected to supply a repetitive sawtooth current waveform to the radial deflection coil system, a video amplifier connected to the cathode ray tube for supplying a trace brightness modulating signal thereto in response to a received radar pulse or a brightening pulse input thereto, a brightening pulse control circuit connected to supply a brightening pulse to the video amplifier, switch means for operating the brightening pulse control circuit, said switch means comprising a continuously rotatable member mounted for rotation together with the radial deflection coil system and a co-operating member mounted for adjustable angular setting about the axis of the cathode ray tube and scale and index means for indicating the angular setting of the co-operating switch member.

References Cited in the file of this patent

UNITED STATES PATENTS

| | | |
|---|---|---|
| 2,422,697 | Meacham | June 24, 1947 |
| 2,688,130 | Whitaker | Aug. 31, 1954 |
| 2,737,653 | Shreve | Mar. 6, 1956 |